United States Patent

Christoff

[15] 3,704,669
[45] Dec. 5, 1972

[54] VIBRATING ROLLER WITH MEANS FOR CIRCULATING A COOLING FLUID FOR USE IN BEARING AND DRIVE GEAR LUBRICATION

[72] Inventor: Chris A. Christoff, Lancaster, Calif.

[73] Assignee: Stevens Corporation, Fort Worth, Tex.

[22] Filed: July 15, 1970

[21] Appl. No.: 55,210

[52] U.S. Cl. ............... 101/349, 34/124, 72/201, 100/93 R, 101/216, 165/90, 308/76
[51] Int. Cl. .................. B41f 13/22, B30h 15/34
[58] Field of Search .............. 101/348–352, 205–209, 101/148, 217, 216, 132; 165/88–92; 100/93, 93 R; 184/6.11, 104; 308/20, 76–77; 74/467–468; 259/1018; 72/200–201; 34/124–125, 119

[56] References Cited

UNITED STATES PATENTS

| | | |
|---|---|---|
| 3,583,687 | 6/1971 | Nakahara et al. ............... 34/124 |
| 3,141,408 | 7/1964 | Bernardi et al. ............... 101/426 |
| 2,260,364 | 10/1941 | Case ............................. 101/219 |
| 1,334,844 | 3/1920 | Day ............................. 74/467 |
| 2,335,131 | 11/1943 | Neuman ......................... 165/87 |
| 2,557,649 | 6/1951 | Gerstenberg .................... 165/92 |
| 2,687,784 | 8/1954 | Klackner ....................... 184/104 |
| 3,065,822 | 11/1962 | McAfee et al. .................. 74/467 |
| 3,469,656 | 9/1969 | Benthake et al. ................ 308/76 |
| 1,107,830 | 8/1914 | Ogden .......................... 308/76 |
| 1,850,878 | 3/1932 | Hunt ............................ 72/201 |
| 2,170,667 | 8/1939 | Smitmans ....................... 308/76 |
| 2,849,951 | 9/1958 | Heinrich ....................... 101/416 |
| 2,915,293 | 12/1959 | Justus et al. .................... 34/124 |
| 2,972,301 | 2/1961 | Gessler et al. .................. 101/426 |
| 2,989,917 | 6/1961 | Brodie ......................... 101/211 |
| 3,120,867 | 2/1964 | Nash ............................ 165/90 |

Primary Examiner—J. Reed Fisher
Assistant Examiner—C. W. Hanor
Attorney—Pennie, Edmonds, Morton, Taylor and Adams

[57] ABSTRACT

There is disclosed a unique vibrating-oscillating roller for use in a rotary press of the offset type wherein the roller has been provided with means for circulating a cooling liquid internally, and thereafter the liquid is used for bearing and drive gear lubrication.

1 Claim, 4 Drawing Figures

INVENTOR.
CHRIS A. CHRISTOFF
ATTORNEYS 3,704,669

VIBRATING ROLLER WITH MEANS FOR CIRCULATING A COOLING FLUID FOR USE IN BEARING AND DRIVE GEAR LUBRICATION

BACKGROUND OF THE INVENTION

Heretofore cooling systems for vibrating-oscillat-ing rollers have employed water circulation throughout the rollers. Since a rotary coupling was used, this system was subject to leakage of cooling water with attendant corrosion and wear problems. Therefore, in order to minimize such problems a closed loop system had to be designed with great difficulty and expense. A separate lubricating system for the vibrating-oscillating roller bearings and its drive gearing also had to be designed.

It is the purpose of the present invention to provide a combined cooling and lubricating system for vibrating-oscillating rollers which obviates the above difficulties.

BRIEF DESCRIPTION OF THE DRAWING

FIG. 3 is a lateral section along line 3—3 of FIG. 2a.

SUMMARY OF THE INVENTION

In accordance with the present invention a cooling system for a vibrating-oscillating roller has been provided wherein there are means for lubricating the drive gearing for said roller and additionally, the bearings for the roller. This system has the advantage of using only one system wherein previously two separate cooling and lubricating systems were required eliminating leakage as a problem associated with a separate water-cooled system.

BRIEF DESCRIPTION OF A PREFERRED EMBODIMENT

Figure 1:
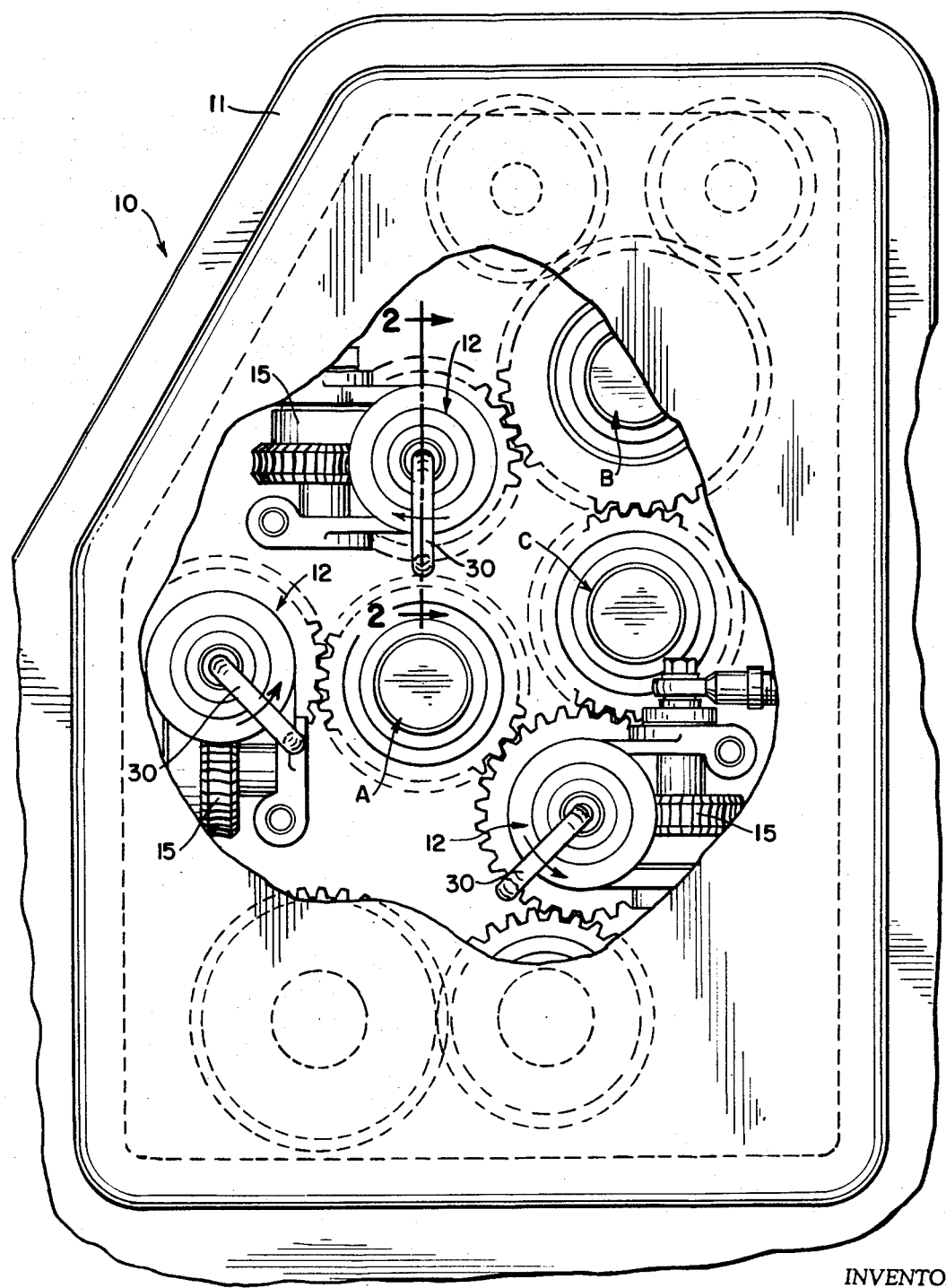
FIG. 1 is a side elevation with parts broken away of a portion of rotary press incorporating the present invention.

Referring now to the drawing and initially to FIG. 1, there has been partially illustrated a rotary press 10 incorporating the present invention, of the type more particularly shown and described in U.S. Pat. No. 3,259,060. The press 10 has side frames 11 which support for rotation a plurality of rollers A, B, C, etc. as well as several vibrating-oscillating rollers 12. Each is journaled within frames 11 and has a drive gear in association therewith. Each roller 12 will be vibrated laterally by conventional means through a worm gear box 15.

Figure 2A:
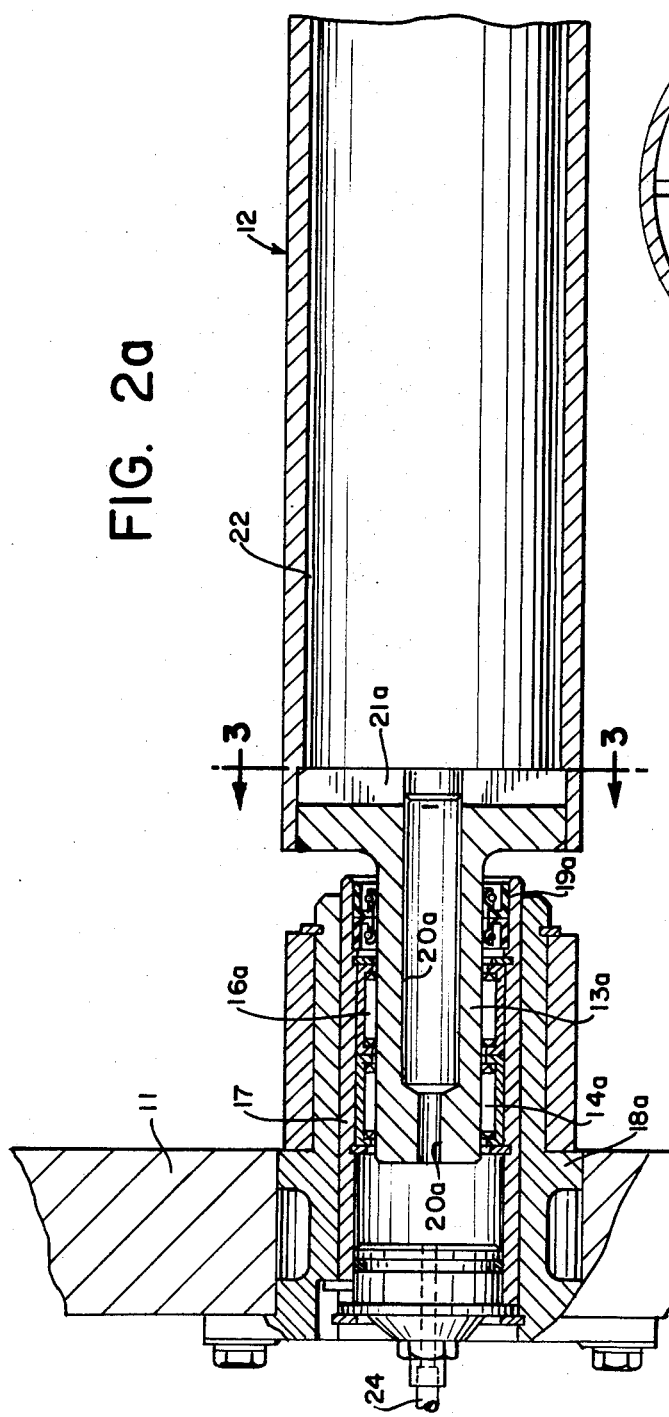
FIGS. 2a, 2b are respectively left and right sectional views of the ends of a vibrating-oscillating roller taken along lines 2a—2a, 2b—2b of FIG. 1.
Figure 3:
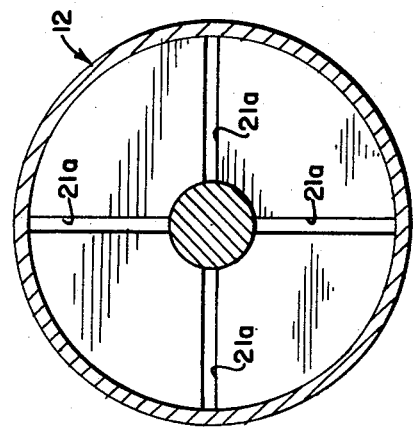
Figure 2B:
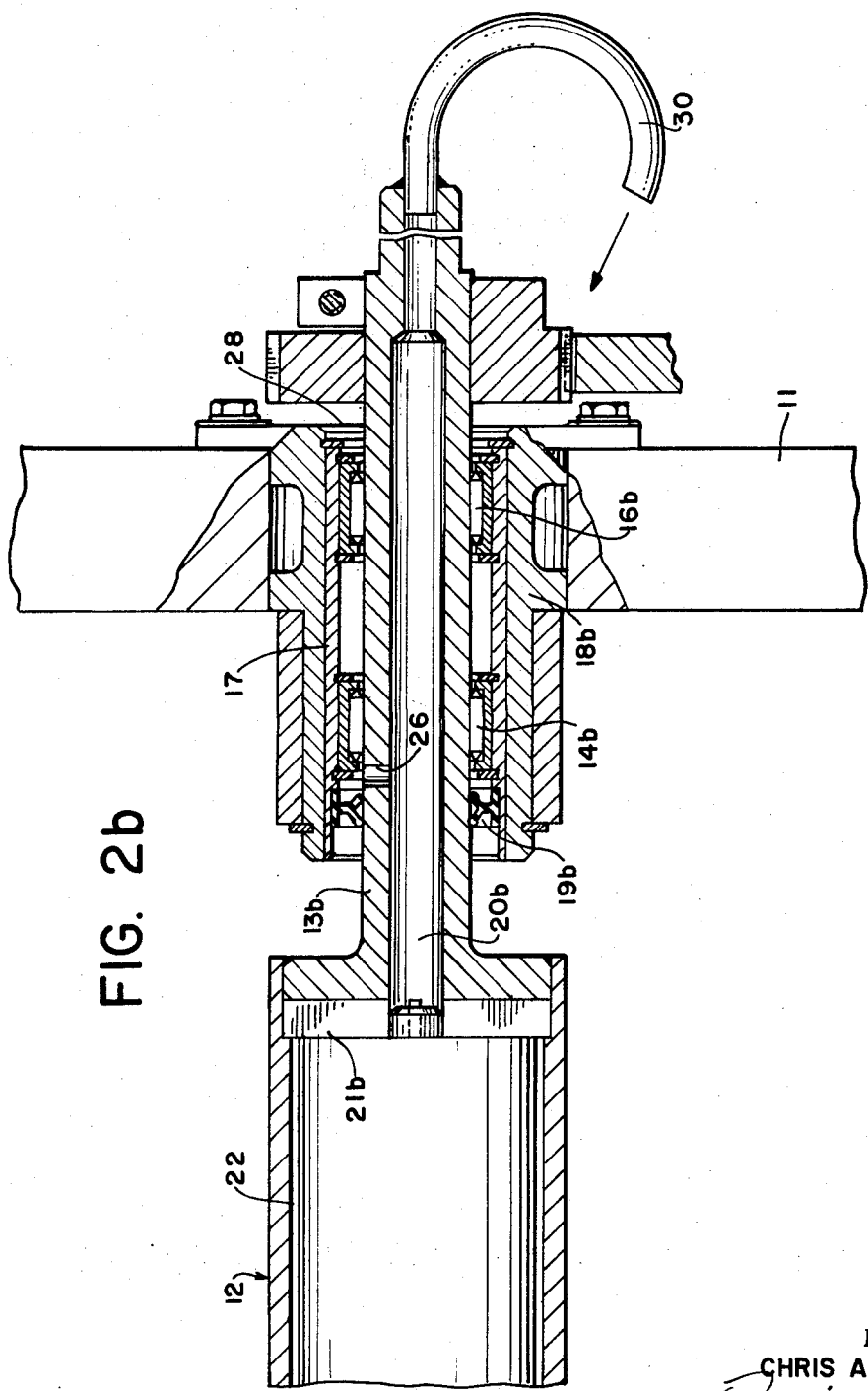

Referring now to FIGS. 2a, 2b and FIG. 3, the shaft ends 13a, 13b of the roller 12 are supported by roller bearings 14a, 14b and 16a, 16b. These are mounted within a hardened sleeve 17 secured within flanged bearing mounts 18a, 18b within the side frames 11. Shaft ends 13a, 13b are sealed adjacent to the inner ends of the bearings by seals 19a, 19b.

Shaft 13a has a center passageway 20a therein which connects with radial slots 21a. The slots 21 connect with cylinderial cooling passage 22 within the roller 12 immediately beneath the outer surface of the roller. Passageway 22 connects with slots 21b and passageway 20b in shaft end 13b.

At the left side of the illustration of FIG. 2, an inlet fitting 23 is connected to a tube 24 for admission of a cooling and lubricating liquid to the shaft bearings 14a, 14b and to the vibrating roller. The liquid will first pass into the bearings where it will lubricate each of the roller bearings 14a and 16a before passing into the central passage 20. Thereafter liquid will flow through slots 21a and through cylindrical cooling passage 22 before passing from the roller 12 through radial slots 21b and central passage 20b. At the right side of the figure, the shaft end 13b has an orifice 26 therein which permits some of the liquid to flow out and pass around roller bearings 14b and 16b before exiting at 28 to flow down the side frame 11. The remainder of the liquid after passing through shaft end 13b will exit through spray tube 30. As best seen in FIG. 1, will cause the liquid to be dispensed about the gearing of roller 12 and adjacent gearing. The liquid after lubricating the various gears as shown will be collected by a suitable drainage system and return via by a pump (not shown) to the input fitting 23. Cooling of the liquid will be provided as needed.

It will be understood that the above description has related to a particular embodiment of the invention and is therefore representative. In order to appreciate the scope of the invention, reference should be made to the appended claims.

What is claimed is:

1. In a rotary offset printing press having two side frames, closely adjacent rollers journalled for rotation in said frames, said rollers including at least one vibrating roller, a stub shaft extending from each end of said vibratory roller, and bearings supporting said stub shafts for rotation within said side frames, said stub shafts defining an axial passage for conducting a lubricating, cooling medium therethrough, a cylindrical passage defined within said vibrating roller beneath the outer surface of said roller, conduit means interconnecting said shaft and roller passages, conduit means interconnecting said shaft passages and said bearings, a series of intermeshing drive gears connected one each at one end of said rollers, and a spray tube rotatably connected to said shaft passage and to one of said stub shafts nearest said drive gears for conducting said cooling, lubricating medium externally of said vibrating roller to lubricate the drive gears of said vibrating roller and of adjacent rollers.

* * * * *